United States Patent [19]

Studtmann

[11] 4,106,334
[45] Aug. 15, 1978

[54] TORQUE TRANSDUCER WITH CLOSELY COUPLED PRIMARY WINDINGS

[75] Inventor: George Henry Studtmann, Mt. Prospect, Ill.

[73] Assignee: Borg-Warner Corporation, Chicago, Ill.

[21] Appl. No.: 797,208

[22] Filed: May 16, 1977

[51] Int. Cl.² ............................................. G01L 3/10
[52] U.S. Cl. .............................. 73/136 A; 73/DIG. 2; 324/209
[58] Field of Search ................ 73/136 A, DIG. 2; 324/34 ST

[56] References Cited

U.S. PATENT DOCUMENTS

| 3,011,340 | 12/1961 | Dahle | 73/DIG. 2 |
| 3,191,115 | 6/1965 | Lloyd | 363/133 |
| 3,265,953 | 8/1966 | Wellford | 363/131 |
| 3,340,729 | 9/1967 | Scoppe | 73/DIG. 2 |

Primary Examiner—Charles A. Ruehl
Attorney, Agent, or Firm—James J. Jennings, Jr.

[57] ABSTRACT

A system for indicating torque and/or speed of a rotatable shaft includes a transducer positioned adjacent the shaft. The transducer has two primary windings wound in a bifilar arrangement on the same magnetic core structure. The primary windings are connected in a manner to facilitate driving of the transducer primary windings with a simple switching circuit.

7 Claims, 8 Drawing Figures

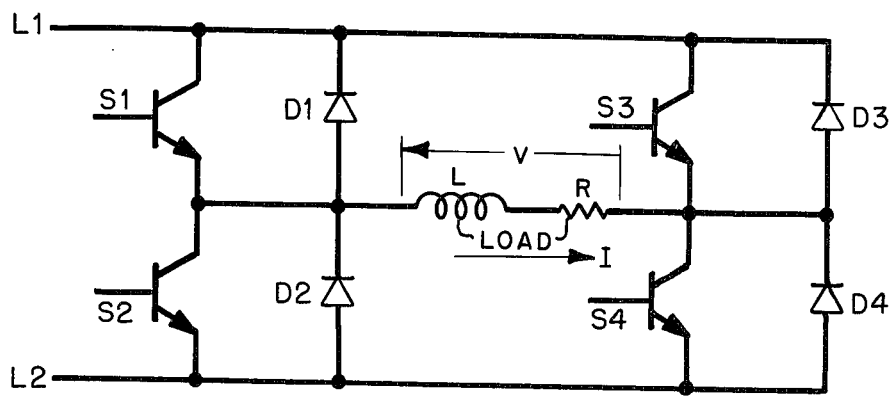
FIG. 2
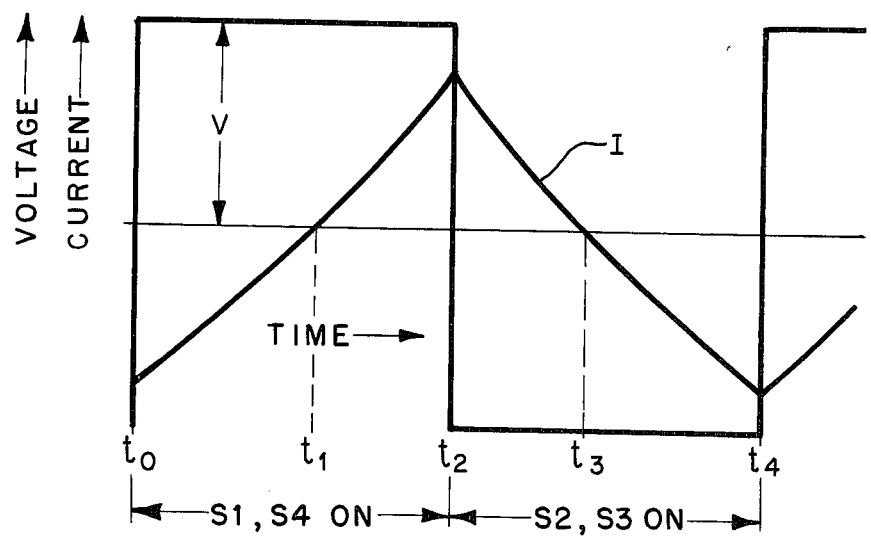
FIG. 3
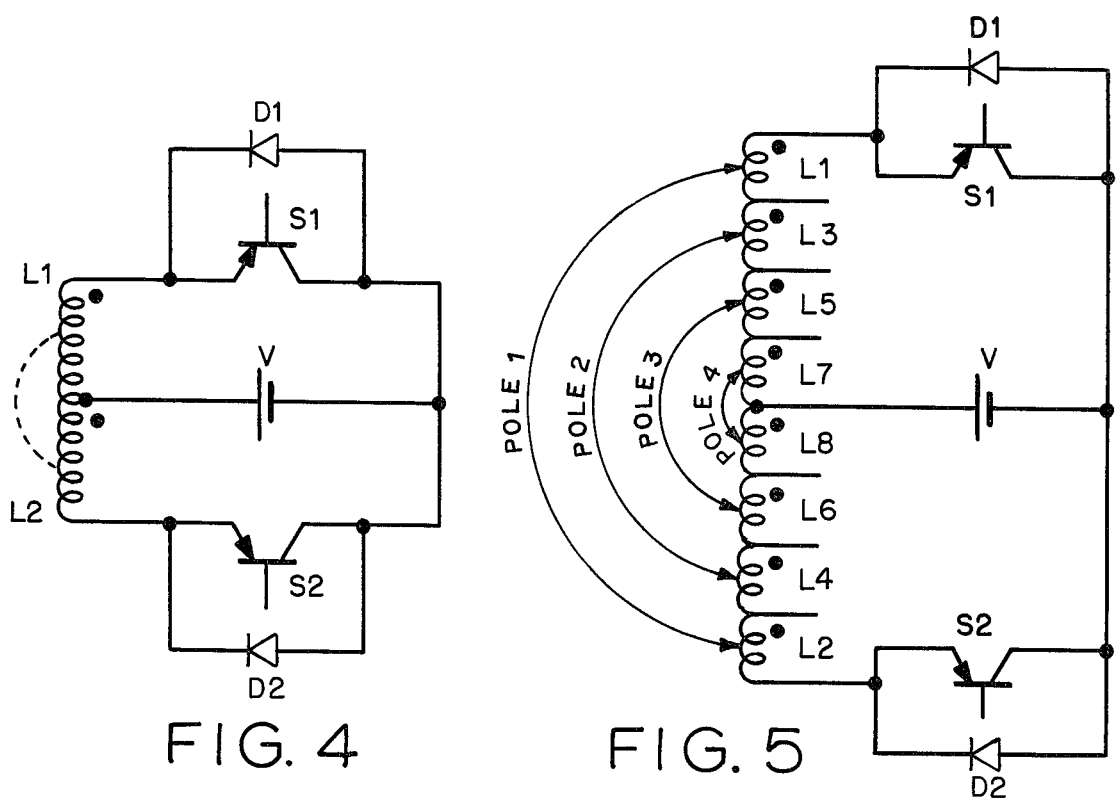
FIG. 4
FIG. 5

TORQUE TRANSDUCER WITH CLOSELY COUPLED PRIMARY WINDINGS

BACKGROUND OF THE INVENTION

Various types of transducers have been developed to measure the changes in a magnetic field adjacent a rotating shaft, to provide information regarding different shaft characteristics such as speed, torque and horsepower. It has been known that a driven or loaded shaft is stressed and this causes compression and tension in various portions of the shaft, changing the shaft permeability and correspondingly varying the magnetic flux pattern in the shaft. Earlier descriptions of this phenomenon are found in patents such as U.S. Pat. Nos. 2,912,642 — Dahle and 3,011,340 — Dahle. However it has proven difficult to adapt these earlier teachings to an economical, compact transducer for use in modern equipment.

A recent, significant advance has been made in the transducer art, and this is set out and claimed in the U.S. application having Ser. No. 747,577, filed Dec. 6, 1976, entitled "System for Measuring Torque and Speed of Rotating Shaft", in the name of Edwin J. Meixner, which is assigned to the assignee of this invention. Even with this significant forward step, in which the physical size and cost of the transducer itself was greatly reduced, it was necessary to provide a bridge-type inverter or a similar switching arrangement to regulate energization of the transducer primary winding. Such an arrangement normally requires four transistors or switches and thus itself adds to the cost and space requirements of the complete instrument system.

It is therefore a primary object of the present invention to provide a torque and/or speed measuring arrangement which is significantly improved as contrasted to known arrangements.

A more particular object of the invention is the provision of such an arrangement in which the most effective trade-off between the driving circuit and the transducer is provided, to provide increased economy and simplification of the system.

SUMMARY OF THE INVENTION

An indicating system constructed in accordance with this invention provides an information signal regarding at least one characteristic, such as torqure or speed, of a rotatable shaft. The transducer comprises at least two physically separated magnetic cores. On the first magnetic core are both the first primary winding and a second primary winding, which in accordance with this invention is wound in a closely coupled fashion. Secondary windings are disposed on the second magnetic core. First and second switches, which can be transistors or equivalent devices, are connected to complete a circuit path for current flow through one of the primary windings when one of the switches is actuated. Means is provided for regulating operation of the switches to cause the current flow through the primary winding and provide an energizing flux adjacent the first magnetic core, thus developing the information signal in the secondary windings of the transducer.

THE DRAWINGS

In the several figures of the drawings, like reference numerals designate like components, and in those drawings:

FIG. 2 is a schematic diagram of a bridge inverter supplying an inductive load;

FIG. 3 is a graphical illustration useful in understanding the operation of the circuit in FIG. 2;

FIG. 4 is a schematic diagram of an inverter circuit with a center-tapped inductor;

FIG. 5 is a schematic diagram useful in understanding the application of the principles of the circuit in FIG. 4 to the transducer and circuit arrangement of this invention;

GENERAL SYSTEM DESCRIPTION

Figure 1:
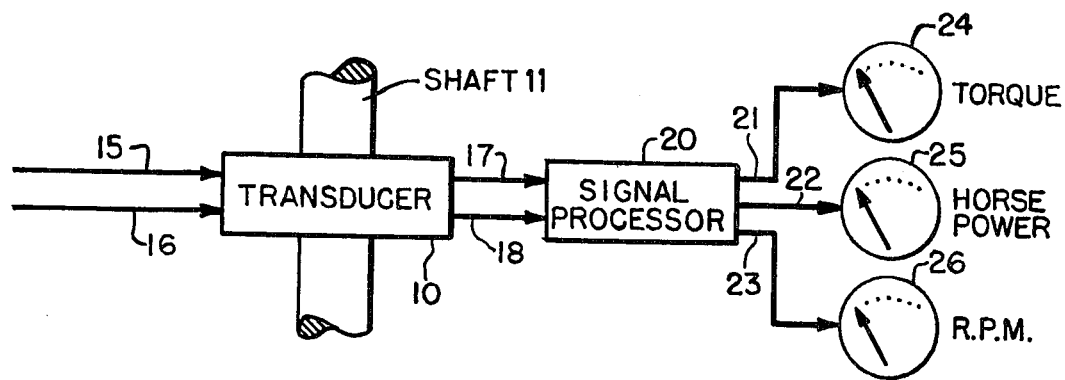
FIG. 1 is a block diagram of a known system for deriving information from a rotating shaft.

FIG. 1 depicts in a general manner one detecting and indicating system which has a transducer 10 positioned around a rotatable shaft 11. The means for driving the shaft and the load driven by the shaft are not indicated, as they are not important for understanding the invention. As will become apparent hereinafter, the transducer includes primary windings for producing a magnetic flux in the portion of shaft 11 adjacent the tranducer. To energize the transducer primary windings, input a-c energy from a conventional 60 hertz, 110 volt line (not shown) can be applied over lines 15, 16. Of course d-c energy and an inverter (not shown) could also be used to supply an a-c exciting signal on lines 15, 16. An output signal from the transducer is passed over output conductors 17, 18 toward a signal processor circuit 20. Separate output conductors 21, 22 and 23 are provided to pass electrical signals to the respective meters 24 for indicating torque, 25 for depicting the horsepower, and 26 to indicate the speed or shaft rpm of the system. Those skilled in the art will appreciate that the term "means for providing an indication" need not refer to a visual illustration means such as a meter, but can be descriptive of a recording unit or other data-receiving instrument. In addition there need not be three separate conductors, or conductor pairs, to depict two or three output quantities. A signal meter can be used to display different parameters in conjunction with a switch or multiplexer which is actuable to select different quantities from the signal processor circuit at different times for display or recording. However, the simplified arrangement of FIG. 1 provides an adequate understanding of several possible displays from the signal processor arrangement.

General Inverter Considerations

FIG. 2 depicts a conventional bridge inverter arrangement in which four transistors S1-S4 are connected in a normal arrangement, with four associated energy recovery diodes D1-D4 connected as shown. A d-c voltage V is applied between the bus conductors L1, L2 so that when S1 and S4 are turned on by application of gating signals in a conventional manner, practically the entire voltage V is applied across the load comprising an inductive component L and a resistive component R as shown. As shown in FIG. 3, at time to switches S1, S4 were gated on or "closed", and the voltage V applied across the load. The current I was flowing through the load from right to left when switches S2, S3 were conducting in the previous half-cycle. Thus after the voltage is reversed at to, although S1, S4 having gating signals applied to them, current continues to flow from right to left from to to time t1, as shown in FIG. 3. This current flow is completed over a path including diodes D4 and D1. As soon as the current reaches zero at time t1, the current flow reverse and begins to flow through S1, the load and S4. This flow continues until time t2, when the gating signals are removed from S1, S4 and applied to S2, S3. Of course the current cannot reverse instantly, but continues to flow in the same direction as shown by the arrow in FIG. 2, decreasing until time t3 when the current reaches zero and reverses. At this time the current reverses and passes through switches S2, S3. It is apparent that this bridge inverter approach requires the use of four switches and four energy recovery diodes.

To reduce the number of switches required, a similar inverter action can be effected with only two switches S1 and S2 connected as shown in FIG. 4, and two energy recovery diodes D1 and D2. The voltage source is represented in a battery in this showing, and the windings L1, L2 must be magnetically coupled and have a center-tapped connection as shown. The current flows in a manner similar to that described in connected with FIG. 3. With S1 in FIG. 4 conducting, the current flows from the battery through winding L1, switch S1, and back to the other side of the battery. When gate drive is applied to S2 and removed from S1, the current is transferred magnetically to the other winding L2, and before it can reverse, D2 completes a path for the decreasing current. When the current reaches zero, it reverses and flows through L2 and S2, back to the other side of the battery.

This technique of inverter operation with a reduced requirement for the number of switching components can be used in a transducer arrangement as shown generally in FIG. 5. In this arrangement the windings L1 and L2 are augmented by the windings L3-L8. This arrangement is that for a four-pole transducer, with the windings paired on each of the four poles. That is, windings L1 and L2 would be closely wound, in a bifilar manner or physically adjacent each other, on the first pole. Windings L3 and L4 would be similarly wound on the second pole, and so forth. With this general background, the structure of the present invention will now be described.

DETAILED DESCRIPTION OF THE INVENTION

Figure 6:
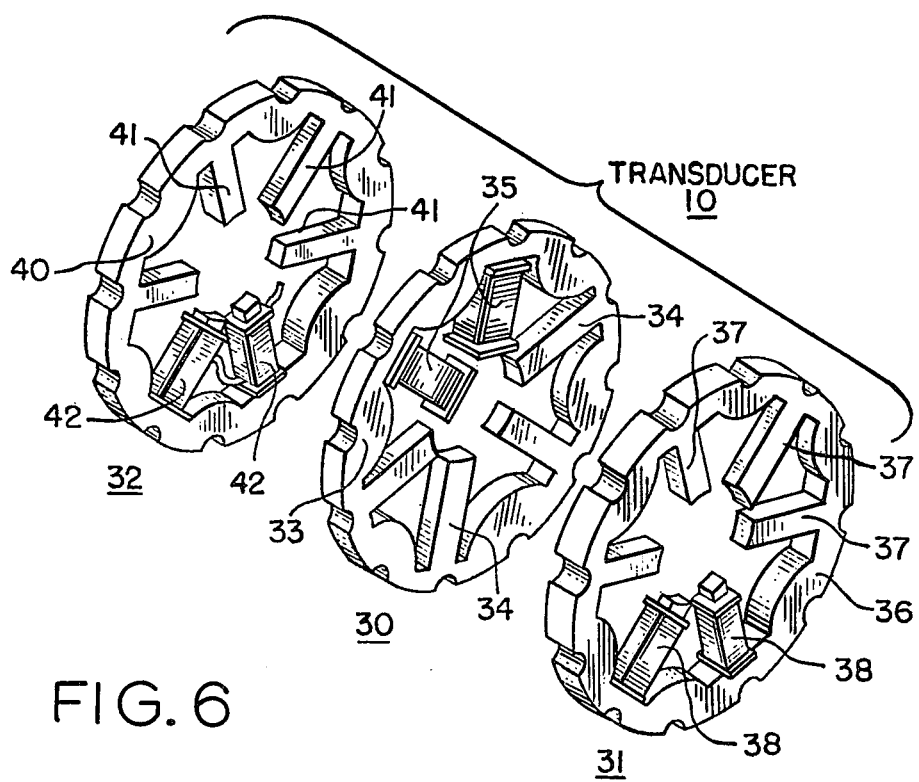
FIG. 6 is an exploded perspective illustration useful in understanding the magnetic core arrangement of one type of transducer.

In the exploded view of FIG. 6, the three different core assemblies 30, 31 and 32 of the transducer 10 are shown. The first magnetic core assembly 30 includes a generally circular outer portion 33 and a plurality of radial pole pieces 34 extending inwardly to a position near the outer surface of the shaft when the transducer is mounted around the shaft as shown in FIG. 1. In one embodiment successfully built and tested the core assembly was provided of laminations approximately 1/64 inch in thickness of electrical grade (M15) steel.

In accordance with this invention, a plurality of bifilar electrical winding pairs 35 are provided as shown, with two of the tightly wound windings 35 being disposed around each of the six pole pieces 34. The bifilar primary windings on pole pieces 34 in one embodiment were comprised of No. 26 wire, with 160 turns in each of the two bifilar windings on a single pole piece. The six windings pairs were then connected in a complete primary electrical circuit as will be explained subsequently in connection with FIG. 7.

The second and third magnetic assemblies 31 and 32 are generally similar to assmembly 30, but the individual pole windings are not bifilar. For example, the second assembly 31 also includes an outer portion 36 and a plurality of individual pole pieces 37, with six individual windings 38 on the six pole pieces. The third magnetic assembly 32 similarly includes an outer magnetic area 40, from which a plurality of individual pole pieces 41 extend inwardly toward the normal shaft position. The six individual windings 42 are respectively disposed on the pole pieces 41 of the third assembly. In the embodiment successfully built and tested, the windings 38 and 42 were comprised of 200 turns on each pole piece, with either No. 32 or 34 wire. The specifications for the wire and the laminations are given by way of illustration only. Those skilled in the art will appreciate that other wire sizes and other laminations, or even a solid magnetic structure, can be used to form the magnetic circuits of the first, second and third assemblies. The individual core pieces are then positioned adjacent each other as shown. It is important to note that the pole pieces 37 and 41 in the second and third magnetic assemblies are each angularly offset with respect to the positions of the pole pieces 34 in the first magnetic assembly 30. That is, in the preferred embodiment, each of the pole pieces 37, 41 is positioned midway between two of the adjacent pole pieces 34 of the central or first magnetic assembly 30.

Figures 7, 8:
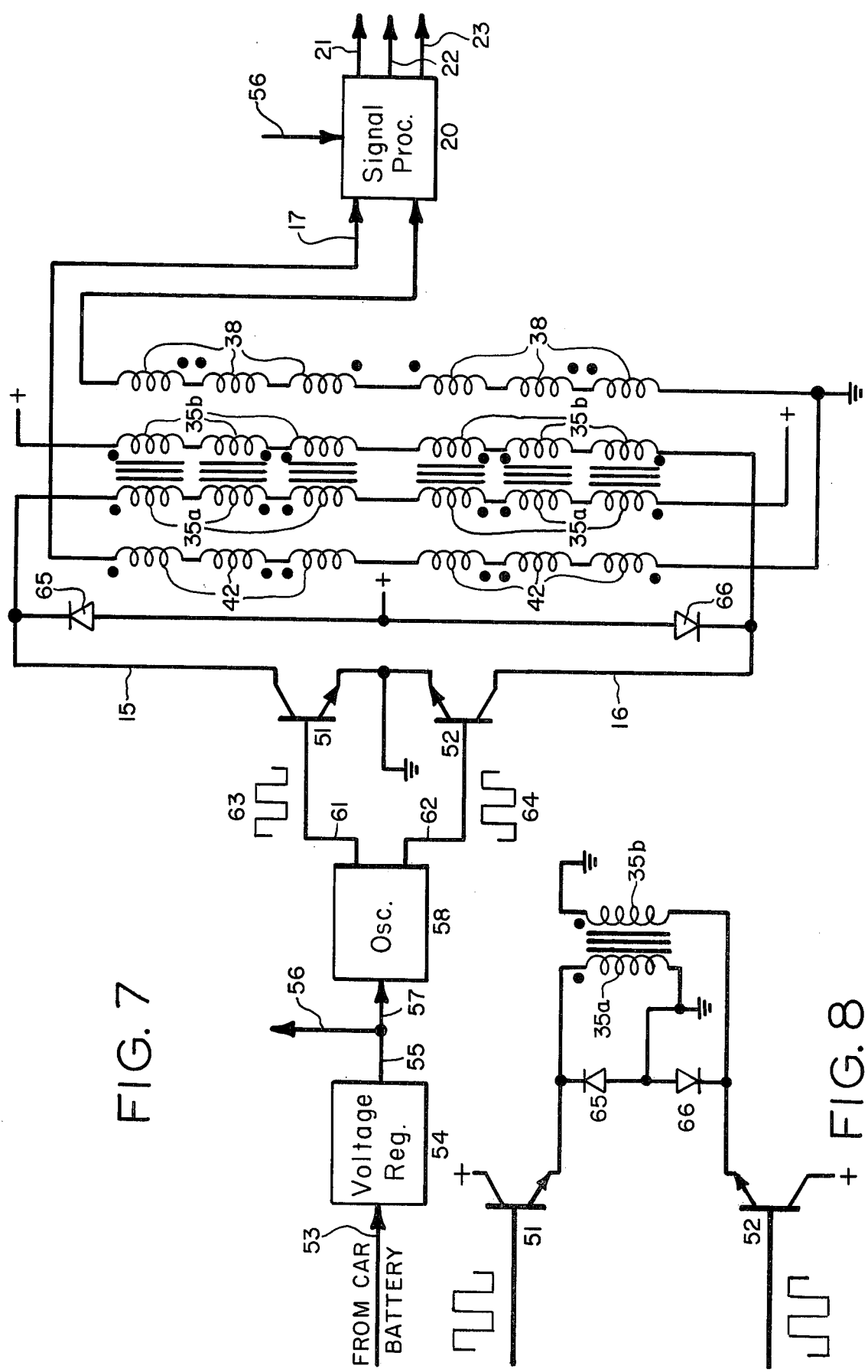
FIG. 7 is a system diagram, partly schematic and partly in block form, depicting a winding arrangement and driving circuit connected in accordance with one embodiment of the invention.
FIG. 8 is a partial schematic illustration depicting another embodiment of the present invention.

FIG. 7 shows the individual windings of the primary and secondary circuits and their interconnection, together with a pair of switches, illustrated as transistors 51, 52, for operating between current conducting and nonconducting states. Those skilled in the art will readily appreciate how these two switches respectively regulate the flow of current through the primary windings, as will be described.

The illustrated system is particularly useful in an automotive or other type system where a d-c supply voltage is received over line 53 and passed through a voltage regulator circuit 54 to a supply line 55. With proper circuit design in which the transducer is operated near saturation, it has been found that the flux density does not change much with changes in battery voltage; hence a voltage regulator circuit is not mandatory to practice the invention. A single line is sufficient to depict the voltage distribution, as those skilled in the art will understand a common ground is provided for all the components. A portion of the output regulated d-c voltage on line 55 is passed over line 56 to energize the signal processor, which may comprise a plurality of circuits as illustrated in the above-identified co-pending application. Some of the energy on line 55 is passed over line 57 to energize oscillator circuit 58. Any suitable circuit can be used for the oscillator, or a plurality of circuits can be combined, to supply on the output lines 61, 62 switching signals represented by the waveforms 63, 64. The two switches 51, 52 are illustrated as NPN-type transistors, and thus a positive-going signal applied to the base of either will cause it to conduct and complete a circuit for current flow through one of the primary windings.

In the primary windings, the two windings on each of the pole pieces 34 are depicted adjacent each other.

That is, the uppermost of the windings 35a is shown adjacent the uppermost one of the windings 35b. These two windings, while electrically distinct, are wound closely together on a single pole piece in a closely coupled manner. In a preferred embodiment these winding pairs were wound in a bifilar arrangement. However the pairs could be layer wound, with a lesser efficiency of the system. Two complete primary windings are thus formed by the circuit connections as shown. The first primary winding comprises the six individual windings 35a, and the second primary winding includes the six windings 35b. Each individual winding represents a series of turns on one of the pole pieces.

The collector of transistor 51 is coupled over conductor 15 to one end of the first primary including coils 35a. The collector of the other transistor 52 is coupled over line 16 to one end of the second primary including coils 35b. The other end of each primary winding is coupled to B+, an energizing potential provided by the voltage regulator. Two protective diodes 65, 66 are connected as shown.

When the potential on line 61 is positive and that on line 62 is negative, the positive-going signal turns on transistor 51 and completes a path for current flow. The path extends from B+ over primary winding 35a, conductor 15, and the collector-emitter path of transistor 51 to ground. Thus at this time current flows through the primary winding portions 35a and develops a magnetic flux adjacent the shaft 11, and a signal is induced in the secondary windings. As shown the secondary windings of the magnetic core assembly 32 are connected to the secondary windings 38 of the magnetic core assembly 31 in a series circuit. This series circuit provides an information signal on lines 17, 18 to the signal processor 20. The co-pending application noted above describes various ways to develop the torque, speed, and horsepower signals from the information signal present on conductors 17, 18. If both torque and speed information are not required, it appears that only one secondary magnetic core assembly is required.

When the switching signals on lines 61 and 62 are reversed, this completes an obvious energizing circuit for the primary windings 35b. Accordingly during this portion of the operating cycle the current flow through these windings develops a flux in the shaft, providing a magnetic signal which develops a current flow through the secondary windings and provides the information signal on lines 17, 18.

Different arrangements can be utilized to energize the primary winding portions 35a and 35b. FIG. 8 shows that the transistors 51, 52 can be connected in a common-collector circuit as opposed to the common-emitter configuration of FIG. 3. Gating on of either transistor switch 51 or 52 in FIG. 8 completes the current flow ciruit through the appropriate primary winding 35a or 35b in an obvious manner.

Technical Advantages

The system described above including closely coupled primary windings for the transducer affords good sensing of stress in the shaft, and likewise allows the system to be driven by a simple switching circuit 51, 52. The simplicity of the driving circuit for the transducer more than offsets the slight additional expense of bifilar winding, or other close coupling, in the primary portion of the transducer.

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. An indicating system for providing an information signal regarding at least one characteristic of a rotatable shaft, comprising:

a transducer, including first, second, and third physically separated magnetic cores, a first primary winding wound on the first magnetic core, a second primary winding wound in a closely coupled manner adjacent the first winding on the first magnetic core, a first secondary winding disposed on the second magnetic core, and a second secondary winding disposed on the third magnetic core, with means for connecting both secondary windings to produce the information signal when the primary windings are energized;

first and second switches, each connected to complete a circuit for current flow through one of the primary windings when that switch is actuated; and means for regulating operation of the switches to provide an energizing flux adjacent the first magnetic core, to develop the information signal in said secondary winding.

2. An indicating system as claimed in claim 1, in which said first and second primary windings are wound in a bifilar manner.

3. An indicating system as claimed in claim 1, and which each of the first and second switches is a semiconductor component.

4. An indicating system as claimed in claim 1, mounted in a vehicle having said rotatable shaft as one of its drive components, and in which the normal energization system of the vehicle is utilized to energize the indicating system.

5. An indicating system for providing an information signal regarding at least one characteristic of a rotatable shaft, comprising:

a transducer, including a first magnetic core assembly, having a generally circular outer portion and at least four radial pole pieces, and a plurality of electrical windings, two of which are wound in a closely coupled arrangement on each one of the pole pieces, and means for coupling all the windings into two separate primary windings, and second and third magnetic core assemblies, each of which is structurally identical to the first magnetic core assembly, with each of the second and third assemblies having a plurality of electrical windings respectively disposed so there is only one winding on each individual pole piece, and means for coupling such windings of the second and third magnetic core assemblies in a secondary circuit;

first and second switching components, connected such that actuation of the first switch completes a circuit for current flow through one primary winding, and actuation of the second switch completes a circuit for current flow through the other primary winding;

means for supplying gating signals to the switching components, to provide an energizing flux from the first magnetic core assembly; and means, coupled to said secondary circuit, for providing said information signal when the system is energized.

6. An indicating system as claimed in claim 5, in which said separate primary windings are wound in a bifilar manner.

7. An indicating system for providing an information signal regarding at least one characteristic of a rotatable shaft, comprising:
- a transducer, including
  - a first magnetic core assembly, having a generally circular outer portion and six radial pole pieces extending inwardly from the circular outer portion toward the outer surface of the rotatable shaft, leaving room for the shaft to extend through the space defined by the ends of the pole pieces, and a plurality of electrical windings, two of which are wound in a bifilar arrangement on each one of the pole pieces in the first magnetic core assembly, and means for coupling all the windings into two separate primary windings, and
  - second and third magnetic core assemblies, each of which is substantially identical to the first magnetic core assembly, with each of the second and third assemblies having a plurality of electrical windings respectively disposed so there is only one winding on each individual pole piece, and means for coupling such windings of the second and third magnetic core assemblies in a secondary circuit, with each of the pole pieces in the second and third core assemblies being angularly offset with respect to the adjacent pole pieces in the first assembly such that each pole piece in the second and third core assemblies is disposed at an angular position midway between the adjacent pole pieces in the first core assembly;
- first and second switching components, connected such that actuation of the first switch completes a circuit for current flow through one primary winding and actuation of the second switch completes a circuit for current flow through the other primary winding;
- means for supplying gating signals to the switching components, to provide an energizing flux from the first magnetic core assembly; and
- means, coupled to said secondary circuit, for providing said information signal when the system is energized.

* * * * *